United States Patent [19]

Snider et al.

[11] Patent Number: 4,893,041

[45] Date of Patent: Jan. 9, 1990

[54] STATOR END CAP INSULATOR ASSEMBLY INCLUDING AN IMPROVED STATOR LINER, STATOR LINER RETAINER AND SHADING ELEMENT INSULATOR

[75] Inventors: S. Duke Snider; L. Ranney Dohogne; Patrick K. Murphy, all of St. Louis County, Mo.

[73] Assignee: Emerson Electric Co., St. Louis, Mo.

[21] Appl. No.: 263,615

[22] Filed: Oct. 27, 1988

[51] Int. Cl.$^4$ .............................................. H02K 3/34
[52] U.S. Cl. ..................................... 310/215; 310/43; 310/45; 310/89; 310/172; 310/259
[58] Field of Search ................... 310/43, 45, 215, 194, 310/172, 71, 254, 217, 218, 260, 269, 91, 259, 214, 258, 180, 208, 42.89

[56] References Cited

U.S. PATENT DOCUMENTS

| | | | |
|---|---|---|---|
| 3,122,667 | 2/1964 | Baciu | 310/215 |
| 3,334,255 | 8/1967 | Peters | 310/215 |
| 4,340,829 | 7/1982 | McCoy | 310/194 |
| 4,481,435 | 11/1984 | Loforese | 310/71 |
| 4,728,836 | 3/1988 | Wrobel | 310/71 |

FOREIGN PATENT DOCUMENTS

| | | | |
|---|---|---|---|
| 3150970 | 6/1983 | Fed. Rep. of Germany | 310/71 |
| 0924292 | 7/1947 | France | 310/215 |
| 0693310 | 8/1965 | Italy | 310/215 |

*Primary Examiner*—R. Skudy
*Attorney, Agent, or Firm*—Polster, Polster and Lucchesi

[57] ABSTRACT

An improved stator end wire insulation assembly for a stator core wherein molded end cap insulator structure for such stator core includes means to restrain stator core opening free-ended insulation liners from both axial and radial movement, the end cap further including means to receive the protruding tips of shading elements of the stator core, insulating the shading element tips from adjacent wound magnetic wire.

6 Claims, 3 Drawing Sheets

STATOR END CAP INSULATOR ASSEMBLY INCLUDING AN IMPROVED STATOR LINER, STATOR LINER RETAINER AND SHADING ELEMENT INSULATOR

BACKGROUND OF THE INVENTION

The present invention relates to end cap insulation for an electromagnetic device and more particularly to an improved end wire insulation assembly for a stator core having pole pieces circumferentially spaced about the central axis of the core.

In the construction of stators for electromagnetic motors, laminations of ferromagnetic material are stacked together to form a stator core with pole pieces circumferentially spaced about the central axis of the core separated by openings extending through the core. Magnet wires are wound by automated winding around each pole to extend through adjacent openings on opposite side flanks of the same pole with the end turns of the winding passing over end cap insulation structure mounted on opposite core faces as described hereinafter. The laminations forming each pole further provide a slot in each pole through which a shading element, advantageously formed of copper extends to protrude slightly outward from each of the stator core end faces. An endless isulating sleeve, advantageously of a flexible pliable plastic material (often a thermoplastic polyester material) is formed into an endless shape to conform with and cover the side walls of the openings through which the automated wound magnet wires extend.

As is disclosed in U.S. Pat. No. 4,340,829, issued to Billy R. McCoy on July 20, 1982, it is known in the art to provide molded end cap structure of insulating material designed for attachment to each end face of the ferromagnetic stator core before magnet wires are wound through adjacent openings on the side flanks of each pole and through corresponding openings in the end cap structure with the end turns of the wound magnet wires passing over end cap structure surrounding such corresponding openings. As is also disclosed in this aforementioned patent, it is generally known to provide retaining means in the end cap structure to overlie the edges of the endless insulating sleeve to retain the sleeve against accidental axial dislodgement from the opening in which it is has been inserted. Further, it is generally known, as also is disclosed in the aforenoted patent, to provide recesses in the undersurface of each molded insulator, disposed to receive the protruding tips or extremities of shading elements which extend outwardly of each end face of a stator core, two spaced recesses being associated in each molded insulator cap for each shading element so that the same insulator cap can engage either end face of the core without interference from the opposed protruding tips or extremities of the shading pieces.

In accordance with the present invention, it has been recognized that the stator core opening insulating sleeve does not always conform to the magnetic coil opening with which it is associated, particularly during automatic winding operations either as a consequence of machining discrepancies between the stator core opening insulating sleeve and the opening with which it is associated or as a consequence of or combined with distorting forces imparted during automated winding operations, particularly during the early stages of the automated winding operations. Further, the present invention has recognized that the mere provision of recesses in the undersurface of molded end cap structure to accommodate the protruding tips or extremities of shading elements has often failed to insure insulation of these protruding extremities from adjacent magnetic coil windings. Recognizing these deficiencies in past molded end cap insulating assembly structures, the present invention provides a straight-forward, efficient and economical to manufacture and assemble molded end cap structure and a novel resilient insulating liner member for a stator core opening adapted to cooperate with an opening in the stator core and the corresponding opening in such end cap structure, such liner member being by its free-ended configuration and resilient nature capable of resiliently conforming with the opening notwithstanding possible manufacturing discrepancies between the stator core opening and the insulating sleeve. Furthermore, such resiliently conforming liner is restrained by said molded end cap structure from not only axial but also radial movement within the core opening with which it resiliently conforms. In addition, the present invention provides a uniquely shaped recess in the undersurface of molded end cap structure to accommodate a protruding extremity of a shading element and insure the insulation of the same from an adjacent magnet coil winding.

Various other features of the several parts of the inventive opening insulating liner, stator end cap insulator, and shading element extremity recess therein will become obvious to one skilled in the art upon reading the disclosure set forth herein.

SUMMARY OF THE INVENTION

More particularly, the present invention provides an improved stator end wire insulation assembly for a stator core having a central axis with pole pieces having solid and face portions circumferentially spaced about the central axis of the core separated by openings extending through the core with magnet wires wound around each pole to extend through adjacent openings on opposite side flanks of each pole comprising: insulating liner means for each of the core openings formed into a shape corresponding to and covering the surrounding wall defining each of the openings; and, a molded end cap insulator structure for attachment to opposite end faces of the core including a pair of plate members formed into a shape corresponding to the end faces of the core and including spaced openings aligned with the spaced openings in the core separated by solid portions which overlie the end faces of the pole pieces, the plates including liner restraining means cooperative with the insulating liner means of each opening to restrain both radial and axial movement of the liner means within the opening relative the central axis of the stator core to maintain the liner means in flush relation with the surrounding wall defining the opening. In addition, the present invention provides a novel, free-ended, flexible and resilient liner sized and configured to snugly and resiliently cover the surrounding wall of a stator opening. Further, the present invention provides a unique recess arrangement in the undersurface of a molded end cap insulator which accommodates the protruding extremity of a shading element and insulates such extremity from adjacent magnet windings.

It is to be understood that various changes can be made by one skilled in the art in one or more of the several parts of the invention described herein without departing from the scope or spirit of the present invention.

BRIEF DESCRIPTION OF THE DRAWINGS

Referring to the drawings which disclose one advantageous embodiment of the present invention.

DETAILED DESCRIPTION OF THE DRAWINGS

Figure 1:
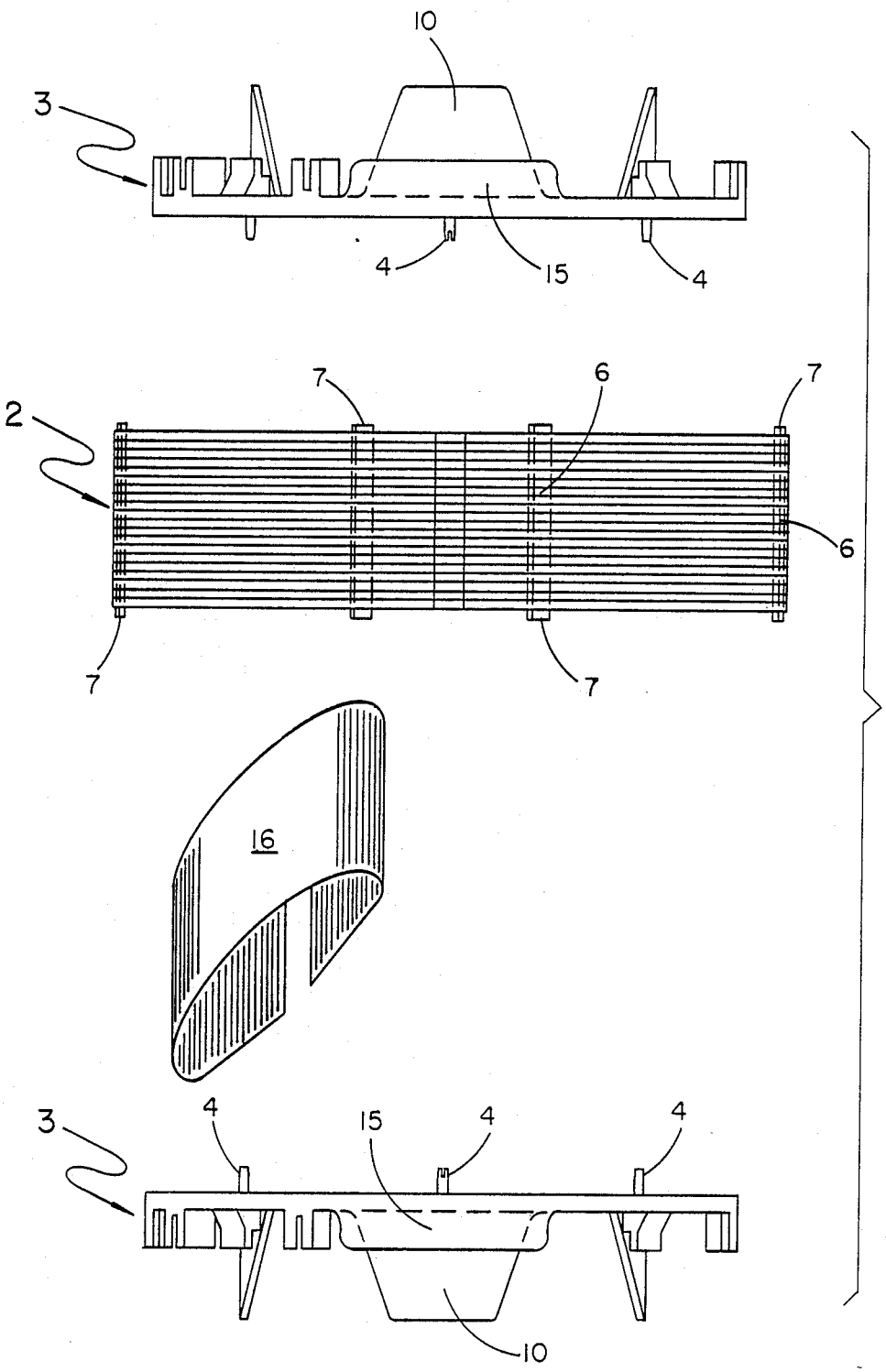
FIG. 1 is an exploded side elevational view of the inventive stator assembly insulating structure, including a stator core, the novel free-ended insulating liner sheet for one core opening and opposed molded end cap insulators.

Referring to FIG. 1 of the drawings which discloses an exploded side view of the inventive stator assembly insulating structure, annular stator core 2, formed from a plurality of annular laminations of ferromagnetic material, as is known in the art, can be seen to receive at opposed end faces thereof a pair of opposed molded end cap insulators 3 which can be molded to properly function when engaged with either face of stator core 2. The end cap insulators 3 are each provided with a plurality of spaced, split guide pins 4 extending normally from the undersurface thereof and adapted to nestingly engage with suitably sized and correspondingly positioned and spaced apertures (not shown) in the opposed faces of stator core 2 to fasten the opposed end cap insulators 3 to the stator core 2. It is to be noted that stator core 2 is provided with a plurality of slots which extend therethrough, each slot serving to receive and support a shading element 6 positioned near the central opening of the annular core. The shading elements 6 advantageously are formed of copper and each has the extremities or tips 7 thereof protruding slightly outwardly beyond the end faces of the core 2.

Figure 2:
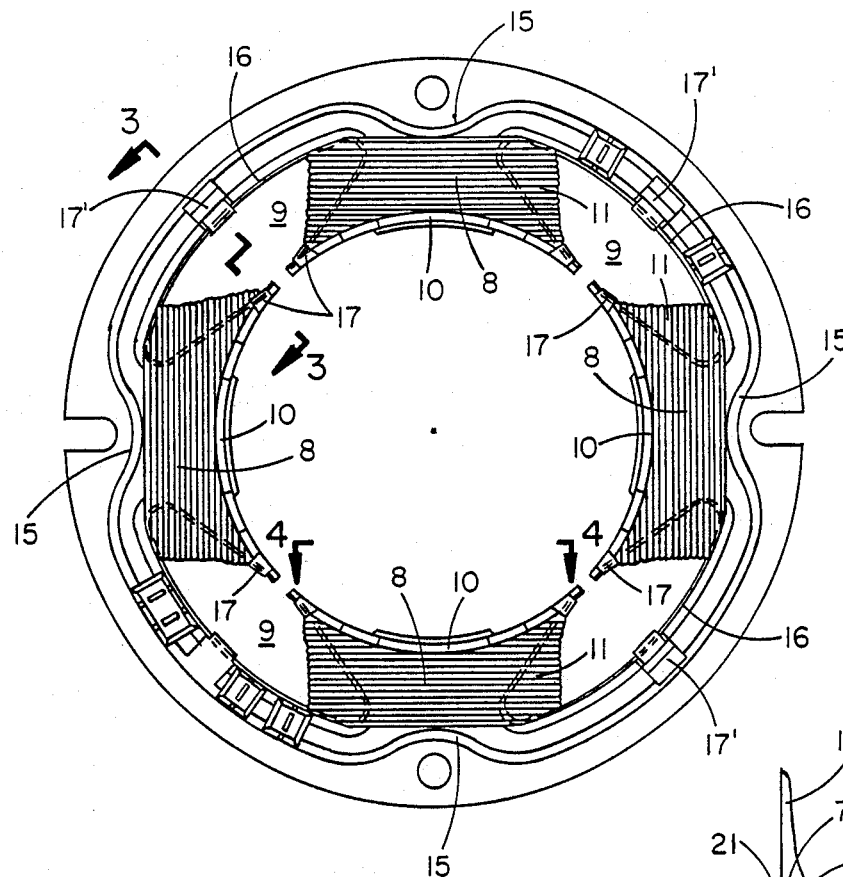
FIG. 2 is a top view of the structure of FIG. 1 in schematic assembled relation further disclosing the free-ended liner sheet positioned in resilient conforming relation with a stator core opening, and the end turns of magnet wires in automated wound relation through the openings of the stator core and end cap insulator.
Figure 6:
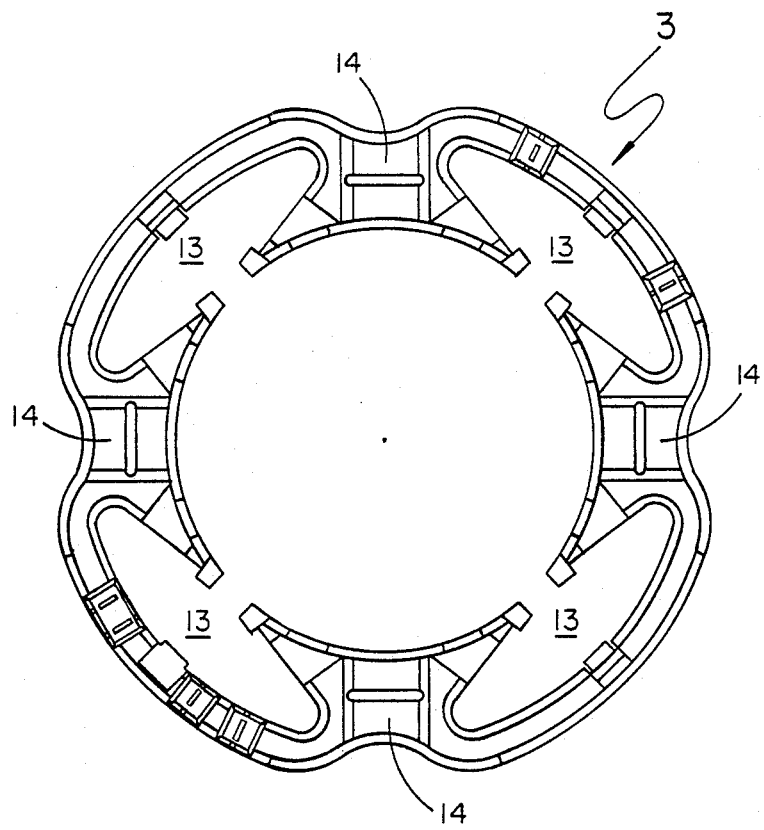
FIG. 6 is a top view of the end cap insulating structure of FIG. 2 without the automated magnet windings.
Figure 7:
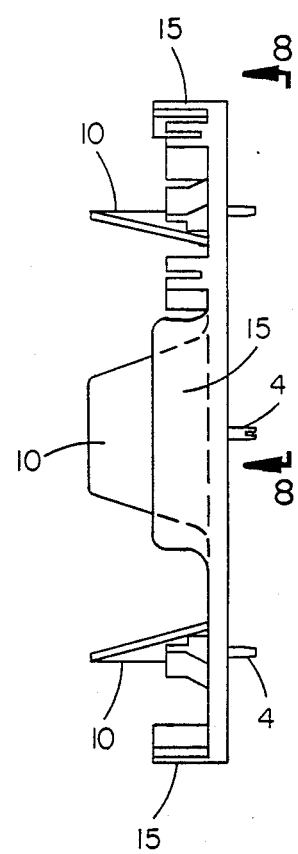
FIG. 7 is a side view of the end cap insulating structure of FIG. 6.

As is known in the art and referring to FIG. 2 of the drawings, annular stator core 2 includes pole pieces 8 circumferentially spaced about the central axis of the core and separated by openings 9 of preselected oval shaped cross-section extending through the core. In the embodiment disclosed, four such pole pieces 8 are provided separated by four such openings 9, but it is to be understood that the number of such pole pieces and openings can be varied in accordance with the design characteristics of the motor—some of which have stator cores which include six or even eight or more of such pole pieces and openings. Each pole piece has a magnet wire 11, advantageously of copper, automatedly wound therearound, the windings including the end cap insulators 3 with pairs of inner and outer flanges 10 and 15 respectively maintaining magnet wires 11 the desired radial distance from the central axis of stator core 2. In this regard, it is to be further noted from FIGS. 1 and 6 of the drawings that each of the pair of end cap insulators 3 attached to opposite end faces of stator core 2 by guide pin members 4 includes an annular plate member formed into a shape corresponding to the end faces of annular stator core 2 to provide spaced oval openings 13 (FIG. 6) to be aligned with spaced oval openings 9 in stator core 2, the spaced oval openings 13 being separated by solid portions 14 which overlie the end faces of the pole pieces 8 and over which the end turns of magnet wires 11 pass. The end cap insulators 3 can be mold formed from any one of a number of suitably insulating moldable materials and advantageously can be formed from a glass fiber reinforced thermoplastic polyester material molded in conforming shape with the end faces of stator core 2, the end cap insulators 3 further including pairs of inner flanges 10 and outer flanges 15 respectively extending normally from the annular plate to maintain the end turns of magnet wires 11 in position as above described.

Figure 3:
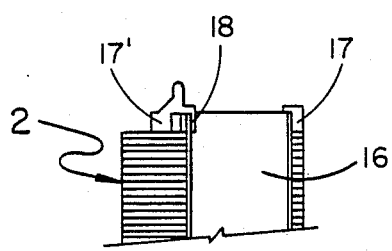
FIG. 3 is a side sectional view of a portion of FIG. 2 taken in a plane through line 3—3 of FIG. 2, disclosing details of the hook and tab arrangement in the end cap insulating structure used to overlie the side edges of the free-ended resilient stator core opening insulating liner to restrain both radial and axial movement thereof.

As can be seen in FIGS. 1 to 3 of the drawings, each of the several openings 9 of stator core 2 is provided with separate and independent insulating liner 16 (only one of the four required liners for the four openings of the stator core 2 being fully disclosed for purposes of illustration). As shown in FIG. 1 of the drawings, insulating liner 16 is initially in the form of a longitudinal sheet which is sized and turned upon itself to be configured to conform with and cover the surrounding wall of an opening 9 in stator core 2 (FIG. 2) with the longitudinal side edges of liner 16 slightly protruding beyond the opposed end faces of the stator core 2 and with opposed free ends turned toward and oppositely spaced from each other within the opening 9 to allow ventilation thereof. Advantageously, each free-ended liner 16 for each stator core opening can be made of a suitable flexible, resilient material such as MYLAR®, a thin sheet of polyester material of great strength with the geometry of each liner 16 and its oval opening 9 with which it snugly and resiliently conforms being such that the desired snug, resilient conformation of liner 16 with the surrounding wall of oval opening 9 can be attained.

As can be seen in FIGS. 2 and 3 of the drawings and further in accordance with the present invention, molded end cap insulators 3 are provided with liner restraining means cooperative with the snugly conforming insulating liner 16 in each opening 9 to restrain both radial and axial movement of liner 16 within an opening to insure that liner 16 remains in flush conforming relation with its inner wall. In this regard, the liner restraining means on end cap insulators 3 includes three tabs comprised of two end taps 17 and an intermediate tab 17' (FIG. 3) extending inwardly over each opening 9 to restrain axial movement of liner 16. These tabs 17 and 17' are so positioned to extend over the opposite edges of the oval conforming liner 16 in each opening 9 with at least one tab, namely 17, being adjacent each of the free ends thereof and with at least one tab, namely 17', being positioned intermediate such free ends (FIG. 2). In this regard, it is to be noted that the tab 17' intermediate the free end engaging tabs is shaped to include a hook member with end portion 18 thereof extending in spaced parallel relation to the surrounding wall of opening 9 to restrain radial movement of liner 16. Thus, not only is axial movement of liner 16 restrained by tabs 17 but hook 18 on tab 17' serves to restrain not only axial but radial movement as well. This end tab and intermediate hook arrangement not only permits ready conforming installation of a free-ended liner 16 into its opening 9 during assembly with the resilience of such free-ended liner enhancing snug conformation thereof with the geometrically preselected core oval, but in addition, the overlying tabs 17 and 17' insure against axial displacement of such free ends of liner 16 during automated winding of magnet wires 11 through aligned openings 9 of core 2 and openings 13 of the facing end caps 3, allowing more freedom of movement of the winding mechanism during winding operations and permitting more uniform and efficient distribution of each of the windings.

Figure 5:
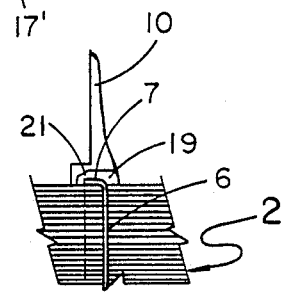
FIG. 5 is a side sectional view taken in a plane through line 5—5 of FIG. 4, disclosing further details of the structure of FIG. 4.
Figure 4:
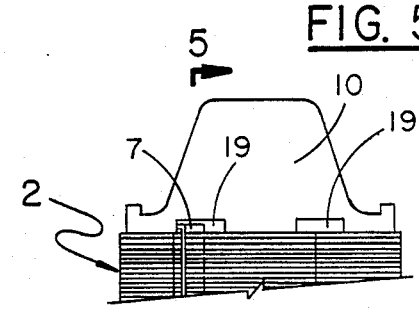
FIG. 4 is a side sectional view of a portion of FIG. 2 taken in a plane through line 4—4 of FIG. 2, disclosing certain of the details of the end cap insulator under surface recess cooperative with the extremity of a shading element protruding beyond the end face of a portion of the stator core.
Figure 8:
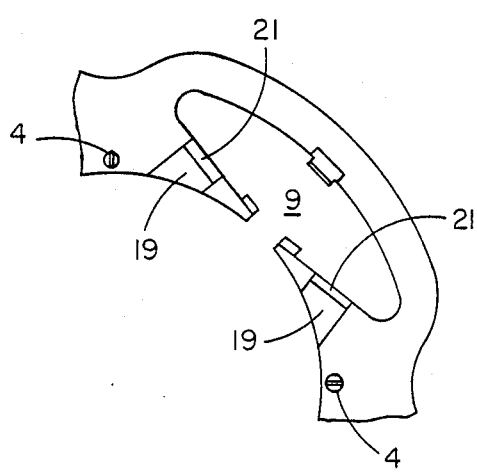
FIG. 8 is an undersurface view of a portion of the end cap insulating structure of FIG. 7, taken in a plane through line 8—8, disclosing further details of the undersurface recess adapted to receive and insulate a protruding extremity of a shading element extending through the stator core.

Referring to FIGS. 4, 5 and 8 particularly of the drawings, it can be seen that end cap insulators 3 are further provided on the undersurfaces of the solid portions 14 thereof with a plurality of molded spaced recesses 19 sized and positioned to accommodate the aforementioned protruding tips or extremities 7 of shading elements 6. In accordance with still another unique and novel feature of the present invention, each recess 19 is further provided with a molded, sloping curtain 21 (FIGS. 5 and 8) at that portion of the recess 19 proximate one of the core openings 9. This curtain 21 which slopes toward the end face of core 2 to which it is assembled, as can be seen in FIG. 5, serves to insulate the protruding extremity 7 of shading element 6 from the ends of magnet wires 11 which are wound around each pole piece 8 to extend through openings 9 of stator core 2.

Thus, with a straightforward, efficient and economical molded end cap insulator arrangement, it is possible to insure both radial and axial retention of resiliently conforming liners for stator core openings and, at the same time, accommodate and insure the insulation of the protruding shading element extremities from magnet windings extending through such stator core openings.

The invention claimed is:

1. An improved stator end wire insulation assembly for a stator core having a central axis with pole pieces having solid end face portions, circumferentially spaced about said central axis of said stator core separated by core openings extending through said core with magnet wires wound around each pole to extend through adjacent core openings on opposite side flanks of each pole to provide end turns adjacent said solid end face portions comprising:

separate and independent insulating liner means for each of said core openings formed into a shape corresponding to and only covering the surround wall defining each of said core openings; and molded end cap insulator structure for attachment to opposite end faces of said core including a pair of plates having solid portions and formed into a shape corresponding to said solid end face portions of said core and including spaced openings aligned with said spaced openings in said core separated by said solid portions to overlie said solid end face portions of said pole pieces, said plates including liner restraining means cooperative with said insulating liner means of each opening to restrain both radial and axial movement of said liner means within its opening to maintain said liner means in flush relation with the surrounding wall defining said opening.

2. The improved stator end wire assembly of claim 1, the insulating liner means for each opening comprising a preselectively sized and formed insulating liner sheet of resilient pliable insulating material having opposed free ends turned toward each other within the opening to provide a sleeve-like form with the material resiliency and free ends helping to maintain said liner sheet in flush relation against said surrounding wall of said opening.

3. The improved stator end wire assembly of claim 1, said liner restraining means in said plate members comprising tabs extending inwardly over each opening to restrain axial movement of said liner means with at least a portion of said tabs being of hook shape to extend in spaced parallel relation to said surrounding wall of said opening to restrain radial movement of said liner means.

4. The improved stator end wire assembly of claim 1, wherein said stator core includes shading elements adjacent said openings with the extremities thereof extending beyond opposite end faces of said core, said solid portions of said plates attached to said end face portions of said core having aligned recesses to accommodate the extremities of said shading elements with the recesses being provided with curtains adjacent said core openings to insulate the extremities of said shading elements from said magnet wires wound around each pole to extend through said core openings.

5. An improved stator end wire insulation assembly for a stator core having a central axis with pole pieces having solid end face portions circumferentially spaced about said central axis of said core separated by openings extending through said core with magnet wires wound around each pole to extend through adjacent openings on opposite side flanks of each pole, said stator core including shading elements extending through said core adjacent said openings with the extremities thereof extending beyond opposite end faces of said core, a molded end cap insulator structure for attachment to opposite solid end face portions of said core including a pair of plates formed into a shape corresponding to said end face portions of said core and including spaced openings aligned with said spaced openings in said core separated by solid portions to overlie the end face portions of said pole pieces, said plates having aligned recesses in said solid portions to accommodate the extremities of said shading elements with the recesses being provided with curtains adjacent said core openings to insulate the extremities of said shading elements from said magnet wires wound around each pole to extend through said core openings.

6. An improved stator end wire insulation assembly for an annular stator core having a central axis with pole pieces circumferentially spaced about said central axis of said core separated by openings of oval cross-section extending through said core with copper magnet wires around each pole to extend through adjacent openings on opposite side flanks of each pole, said stator core including copper shading elements extending through said core adjacent said openings with the extremities thereof projecting beyond opposite end faces of said core;

a preselectively sized and formed free-ended insulation liner sheet of resilient, pliable polyester insulating material with opposed ends of said sheet turned toward each other in spaced relation with each opening to provide a sleeve-like form with the material resiliency helping to maintain said liner sheet in flush relation against said surrounding wall of said opening and with the side edges of said sheet extending a small preselected distance beyond the end faces of said annular stator core;

a molded thermoplastic polyester end cap insulator structure for attachment to opposite end faces of said core including a pair of annular plates formed into a shape corresponding to said end faces of said annular stator core to provide spaced openings aligned with said spaced openings in said annual stator core separated by solid portions to overlie the end face portions of said pole pieces;

said solid portions of said plates having aligned recesses therein to accommodate the extremities of said copper shading elements with the recesses being provided with curtains adjacent said openings to insulate the projecting extremities of said shading elements with the recesses being provided with integral molded curtains adjacent said openings to insulate said projecting extremities of said shading elements from said magnet wires wound around each pole to extend through said openings of said plate members and said annular stator core; and, said plates including liner restraining means in the form of three spaced integral tabs extending inwardly over each opening of said stator with two of said tabs positioned to axially restrain the projecting side edges of said mylar free-ended sleeve-like liner at oppositely spaced ends thereof and with the intermediate tab being of hook shape to extend in spaced parallel relation to said surrounding wall of said opening to restrain both axial and radial movement of said side edges of said polyester free-ended liner intermediate the oppositely spaced ends thereof.

* * * * *